(12) United States Patent
Klenke et al.

(10) Patent No.: US 9,484,709 B2
(45) Date of Patent: Nov. 1, 2016

(54) OPTICAL AMPLIFIER ARRANGEMENT

(75) Inventors: Arno Klenke, Jena (DE); Enrico Seise, Tautenhain (DE); Jens Limpert, Jena (DE); Andreas Tuennermann, Weimar (DE)

(73) Assignees: FRAUNHOFER-GESELLSCHAFT ZUR FOERDERUNG DER ANGEWANDTEN FORSCHUNG E.V., Munich (DE); FRIEDRICH-SCHILLER-UNIVERSITAET JENA, Jena (DE)

( * ) Notice: Subject to any disclaimer, the term of this patent is extended or adjusted under 35 U.S.C. 154(b) by 37 days.

(21) Appl. No.: 13/819,392

(22) PCT Filed: Aug. 29, 2011

(86) PCT No.: PCT/EP2011/004321
§ 371 (c)(1),
(2), (4) Date: May 7, 2013

(87) PCT Pub. No.: WO2012/028287
PCT Pub. Date: Mar. 8, 2012

(65) Prior Publication Data
US 2013/0235448 A1     Sep. 12, 2013

(30) Foreign Application Priority Data

Aug. 31, 2010 (DE) .................. 10 2010 036 030
Nov. 30, 2010 (DE) .................. 10 2010 052 950

(51) Int. Cl.
*H01S 3/23* (2006.01)
*H01S 3/13* (2006.01)
(Continued)

(52) U.S. Cl.
CPC .......... *H01S 3/2308* (2013.01); *H01S 3/0057* (2013.01); *H01S 3/1307* (2013.01); *H01S 3/2383* (2013.01); *H01S 3/06754* (2013.01); *H01S 3/2316* (2013.01)

(58) Field of Classification Search
CPC .......... H01S 3/2308; H01S 3/094061; H01S 3/2383; H01S 3/2391; H01S 3/0057; H01S 3/1307; H01S 3/06754; H01S 3/2316
See application file for complete search history.

(56) References Cited

U.S. PATENT DOCUMENTS 4,474,435 A * 10/1984 Carlsen .................... G02F 1/03
                                              359/320
4,566,761 A *  1/1986 Carlsen .................. G02B 6/105
                                              359/484.07

(Continued)

OTHER PUBLICATIONS

International Search Report of PCT/EP2011/004321, Aug. 7, 2012.
(Continued)

*Primary Examiner* — Eric Bolda
(74) *Attorney, Agent, or Firm* — Collard & Roe, P.C.

(57) ABSTRACT

The invention relates to an optical amplifier arrangement for amplifying ultra-short pulsed laser radiation comprising a mode-locked laser (1) and two or more optical amplifiers (3) arranged downstream of the laser (1) in the propagation direction of the laser radiation. Optical amplifier arrangements of this type are known in the prior art. Here the intention is to present an alternative to the known amplifier arrangements. The invention proposes arranging between the laser (1) and the optical amplifiers (3) at least one splitting element (2) which splits the pulsed laser radiation between a plurality of amplifier channels (4), wherein each amplifier channel (4) has at least one optical amplifier (3), and wherein at least one common combination element (5) is disposed downstream of the amplifier channels (4) and coherently superimposes the pulsed laser radiation amplified in the amplifier channels (4).

8 Claims, 3 Drawing Sheets

(51) Int. Cl.
*H01S 3/067* (2006.01)
*H01S 3/00* (2006.01)

(56) References Cited

U.S. PATENT DOCUMENTS

| | | | | |
|---|---|---|---|---|
| 4,685,773 | A * | 8/1987 | Carlsen | G02B 6/105 359/484.07 |
| 5,121,400 | A * | 6/1992 | Verdiell et al. | 372/32 |
| 5,287,216 | A * | 2/1994 | Chirravuri | H01S 3/094003 359/341.33 |
| 5,379,142 | A * | 1/1995 | Handa | G02B 6/126 385/24 |
| 5,541,947 | A * | 7/1996 | Mourou et al. | 372/25 |
| 5,694,408 | A * | 12/1997 | Bott et al. | 372/6 |
| 5,847,863 | A * | 12/1998 | Galvanauskas et al. | 359/341.3 |
| 5,867,304 | A * | 2/1999 | Galvanauskas et al. | 359/333 |
| 6,208,442 | B1 * | 3/2001 | Liu | G02B 6/29302 398/9 |
| 6,400,860 | B1 * | 6/2002 | Chandrasekhar | G02B 6/12011 385/11 |
| 6,697,192 | B1 * | 2/2004 | Fan et al. | 359/349 |
| 6,751,240 | B2 * | 6/2004 | Arisawa et al. | 372/3 |
| 7,233,442 | B1 * | 6/2007 | Brown et al. | 359/556 |
| 7,379,648 | B1 * | 5/2008 | Brooks et al. | 385/126 |
| 7,400,804 | B1 * | 7/2008 | Di Teodoro et al. | 385/114 |
| 7,440,174 | B2 * | 10/2008 | Rice et al. | 359/341.1 |
| 7,876,803 | B1 * | 1/2011 | Di Teodoro | H01S 3/06791 372/10 |
| 8,531,761 | B2 * | 9/2013 | Chann et al. | 359/333 |
| 2003/0099439 | A1 | 5/2003 | Ionov | |
| 2004/0125846 | A1 * | 7/2004 | Zediker et al. | 372/50 |
| 2004/0190119 | A1 * | 9/2004 | Tauser et al. | 359/333 |
| 2005/0201429 | A1 * | 9/2005 | Rice et al. | 372/27 |
| 2007/0201795 | A1 * | 8/2007 | Rice et al. | 385/39 |
| 2008/0037028 | A1 | 2/2008 | Cheung et al. | |
| 2008/0043789 | A1 * | 2/2008 | Moro et al. | 372/25 |
| 2008/0181268 | A1 * | 7/2008 | Dubois et al. | 372/30 |
| 2010/0142573 | A1 | 6/2010 | Minden | |
| 2010/0260496 | A1 * | 10/2010 | Tosetti | H04B 10/2587 398/7 |
| 2013/0063808 | A1 * | 3/2013 | Rothenberg | 359/334 |
| 2013/0177031 | A1 * | 7/2013 | Almeida et al. | 372/6 |
| 2013/0336344 | A1 * | 12/2013 | Palese et al. | 372/20 |

OTHER PUBLICATIONS

Jiang, S et al.: "Impact of self-phase modulation on coherently combined fiber chirped-pulse amplifiers," Optic Letters, OSA, Optical Society of America, Washington, DC, US, vol. 35, No. 8, Apr. 15, 2010, pp. 1293-1295, XP001553256, ISSN: 0146-9592. (ISR).

Mourou, G A et al.: "The Road to High Peak Power and High Average Power Lasers: Coherent-Amplification-Network (CAN)," AIP Conference Proceedings, American Institute of Physics, New York, US, vol. 827, No. 1, Jan. 1, 2006, pp. 152-163, XP002430795, ISSN: 0094-243X. (ISR).

Eric C. Cheung et al.: "Phase Locking of a Pulsed Fiber Amplifier," Advance Solid-State Photonics, Jan. 27, 2008, pp. WA2-1, total of 3 pages, XP55031744. (ISR).

Daniault, L et al.: "Coherent beam combining of two femtosecond fiber chirped-pulse amplifiers," Optic Letters, OSA, Optical Society of America, Washington, DC, US, vol. 36, No. 5, Mar. 1, 2011, pp. 621-623, XP001560608, ISSN: 0146-9592. (ISR).

Enrico Seise et al.: "Coherent addition of fiber-amplified ultrashort laser pulses," Optics Express, vol. 18, No. 26, Dec. 20, 2010, pp. 27827-27835, XP55031748, ISSN: 1094-4087. (ISR).

* cited by examiner

OPTICAL AMPLIFIER ARRANGEMENT

CROSS REFERENCE TO RELATED APPLICATIONS

This application is the National Stage of PCT/EP2011/004321 filed on Aug. 29, 2011 which claims priority under 35 U.S.C. §119 of German Application No. 10 2010 052 950.8 filed on Nov. 30, 2010 and German Application No. 10 2010 036 030.9 filed on Aug. 31, 2010, the disclosure of which is incorporated by reference. The international application under PCT article 21(2) was not published in English.

BACKGROUND OF THE INVENTION

1. Field of the Invention

The invention relates to an optical amplifier arrangement for amplifying ultra-short pulsed laser radiation comprising a mode-locked laser and two or more optical amplifiers arranged downstream of the laser in the propagation direction of the laser radiation.

2. Description of the Related Art

Optical amplifier arrangements comprising a laser and downstream arranged optical amplifiers are known in large number from prior art. These arrangements are required to amplify the output radiation from pulsed lasers so as to ensure sufficient pulse energy in order to meet tasks in materials processing in medicine or science.

The output energy and the pulse peak rate of ultra-short pulse amplifiers known in prior art are limited due to various physical effects or technical features of the amplifier arrangement. For example, a high peak intensity of the short laser pulses leads to non-linear effects in the amplifier medium which deteriorate pulse quality and thus limit the maximum pulse peak rate in the amplifier. Likewise, the laser material destruction threshold and/or the maximally possible thermal load due to absorption confine the achievable amplifier output rate.

Ultra-short pulse amplifiers known in prior art include chirped pulse amplification amplifiers (CPA amplifiers). With these amplifiers, pulses to be amplified are at first temporally stretched out by means of a pulse stretcher so that the pulse peak rate is diminished. Pulses stretched out this way are subsequently amplified by means of one or more amplifiers and temporally re-compressed within a pulse compressor. Hereby it is possible to achieve a high amplification factor whilst avoiding non-linear effects.

Furthermore it is known in prior art evading a degradation in pulse quality due to non-linear effects by applying the method of pulse forming. With this method, the phase, amplitude or other parameters of the laser pulse are varied by the aid of suitable optical elements, e.g. optical modulators.

When using fiber-optical amplifiers, so-called LMA fibers are often utilized. In contrast with conventional single mode fibers, these large mode area fibers have an enhanced core diameter in which, however, only a few modes are capable of propagating. Thus, on account of the larger radiation area, a variation of the mode field diameter enables a corresponding increase in the possible pulse peak rate.

Furthermore known in prior art is the use of external passive resonators in which the pulses are coherently superimposed, thus causing a rise in the intra-cavity rate, in order to amplify ultra-short laser pulses It is also known combining several lasers with different frequencies incoherently to achieve high-energetic laser radiation. Scaling the output rate in cw mode or in pulsed mode with pulse lengths in the nanosecond range is thus made possible.

In prior art, it is also known to combine the output rate of several cw lasers coherently, with it being possible to scale the output rate as demanded. Coupling is accomplished by applying the technique of a so-called self-injection seeding and/or active stabilization.

Besides, a coherent superposition of laser pulses may also be realized with spectrally separated single spectra. Thus it is made possible to generate pulses having pulse lengths substantially reduced as compared with output pulses.

The approaches outlined hereinabove and geared to generate high-efficient ultra-short laser pulses can achieve good results depending on a given application situation.

SUMMARY OF THE INVENTION

It is the object of the present invention to provide an alternative to prior art approaches and thus to furnish a user with a broader choice of suitable amplifier arrangements in order to select the most suitable amplifier variant for his application.

The approach presented hereinabove is based on evading limitations in pulse peak rate and/or output energy of ultra-short pulse amplifiers.

This is accomplished by arranging at least on splitting element between the laser and the optical amplifiers, said splitting element splitting the pulses laser radiation to several amplifier channels, with each amplifier channel comprising at least one optical amplifier, and with arranging at least one common combination element downstream of the amplifier channels, said combination element coherently superimposing the pulsed laser radiation amplified in the amplifier channels.

By way of inventively splitting the laser beam utilizing a splitting element and by way of the subsequent separate amplification within several parallel amplifier channels, it is ultimately possible to achieve higher pulse peak and average rates than it would be possible with one or several amplifiers for the entire laser beam. Superimposing the laser radiation from single amplifier channels is done coherently, i.e. the laser pulses must have a firm phase relationship to each other so that a stable output pulse is formed after superimposing. The optical path length between the splitting element and the combination element is so adjusted and set for each channel that the difference of the optical path lengths between two channels each does not account for more than Lambda/4. The path length Lambda is intended to represent the medium wavelength of the applied laser radiation. Alternatively, the optical path length between the splitting element and combination element can also be adjusted in a manner that the difference of the optical path lengths between two channels accounts for a multiple of Lambda plus one offset, this offset not being greater than Lambda/4.

Furthermore, this difference should maximally be as large as the product from light velocity c and temporal pulse width of the applied laser pulse in the transform limit $\Delta\tau$. Splitting the laser beam into parallel amplifier channels by way of the splitting element can be realized both in even portions and in odd portions relative to pulse energy. In practice it basically turned out to be advantageous for the mode-locked laser to emit a nearly linearly polarized radiation. Likewise it is advantageous that the laser radiation downstream of the single amplifier channels, i.e. prior to re-combining, is polarized nearly linearly. Thereby a nearly linear polarization of the pulses can be reached after combining.

Prior to splitting, the ultra-short laser pulses emitted by the laser are pre-amplified optionally in one or in several amplifiers or amplifier systems. Subsequently the laser beam is split in several beams to various channels where the individual beams are optically amplified, for example, up to the limits of the relevant amplifier system. On the whole, an amplification factor being much higher than achievable by amplifying a non-split overall pulse is thus rendered possible.

Coherence and/or synchronization of the individual amplified beam portions in parallel amplifier channels is ensured by having emitted the radiation from a joint laser source. Additional potential deviations of the individual pulse portions among each other, e.g. relative to the optical path length, can be corrected by an active stabilization.

Expediently the optical amplifier arrangement comprises at least one overall pre-amplifier arranged between the laser and the splitting element. Here, the still non-split output beam of the laser can be pre-amplified to an extent as permitted by the limits and restrictions of the relevant overall pre-amplifier. The overall pre-amplifier may also be comprised of several amplifier stages.

It is furthermore provided for that the splitting element of the optical amplifier arrangement is a partly-reflecting mirror, a polarizing beam divider, an interferometric beam divider, a plane-parallel plate or a combination of these elements. All of the a.m. splitting elements are suitable for splitting the laser output beam into even or odd portions. One can utilize both a single beam divider and an arrangement of several beam dividers. For example, when applying several polarizing beam dividers, an arrangement of elements one behind the other can be so implemented that the laser radiation between polarizing beam dividers is turned by waveplates in such a manner that a further splitting of the laser radiation can be realized. Likewise it is also conceivable that the polarizing beam dividers consecutively arranged are twisted versus each other in such a manner that a further splitting of the laser radiation can be realized.

In accordance with the present invention, the optical amplifiers and/or overall pre-amplifiers are fiber-optical amplifiers or combinations of optical amplifiers. By way of several consecutively arranged pre-amplifier stages, the output signal of the laser can be maximally pre-amplified so that the subsequent amplification in the individual amplifier channels can also be accomplished optimally by one is or several amplifiers. A use of fiber-optical amplifiers allows for a simple integration into a fiber-based amplifier system.

Similarly to the afore-mentioned configuration of the splitting element it is also possible that the combination element is a partly-reflecting mirror, a polarizing beam divider, an interferometric beam divider, a plane-parallel plate or a combination of these elements. Owing to a consecutive arrangement of several polarizing beam dividers as combination elements, it is made possible to arrange rotatable waveplates between the individual beam dividers in such a manner that a further combination of the laser radiation can be realized. Likewise, the polarizing beam dividers themselves can be twisted versus each other in such a manner that a further combination is realized. Moreover, the proposed combination elements can be arranged both individually and in combination with each other so as to achieve the best possible result for a given application.

In another advantageous configuration of the invention it is provided for that the optical amplifier arrangement comprises a pulse stretcher upstream to the splitting element and a pulse compressor downstream of the combination element which forms a CPA system in conjunction with the optical amplifiers of the amplifier channels. In addition to the inventive teaching of the main claim, the chirped pulse amplification principle is brought in here. According to this principle, the pulse stretcher serves for stretching the laser pulses temporally so that they have a lesser pulse peak rate while the energy is the same. Thereby it is possible to amplify the laser pulses in the downstream amplifiers with higher amplification factors. Upon amplification and after a combination by means of the combination element, the pulse duration of the laser pulses is again shortened in the pulse compressor. Additionally or alternatively to the pulse stretcher and the pulse compressor outside the amplifier channels, it is also possible that a pulse stretcher in one or several amplifier channels temporally stretches the laser pulses or that a pulse compressor temporally shortens the laser pulses. The overall amplification factor of the optical amplifier arrangement can hereby be maximized.

In a variant of the present invention it is provided for that the amplifier channels is upstream to the optical amplifiers comprise fiber-optical modulators. By way of these fiber-optical modulators, the temporal phase of the pulses within the amplifier channels can be so varied that the individual pulses when combined have the least possible phase difference.

In a variant of the present invention it is provided for that the optical amplifier arrangement is comprised of several splitting elements arranged in stages one behind the other, each of which splitting the incoming pulsed laser radiation to two amplifier channels. By way of this stage-wise splitting of the laser radiation, a plurality of possible arrangements of the splitting elements is obtained which entail various advantages and disadvantages concerning a coherent combining. For example, it is conceivable that each amplifier channel created by splitting again comprises a splitting element which splits the pulses laser radiation to another two amplifier channels each. Alternatively, however, even only one of the two amplifier channels created by splitting may again comprise a splitting element which splits the pulsed laser radiation to another two amplifier channels each. Other splitting variants not mentioned here are explicitly deemed included within the scope of the present invention.

The present invention also provides for that the optical amplifier arrangement is comprised of several combination elements arranged in stages one behind the other, each of which combining the pulsed laser radiation from two amplifier channels in a joint amplifier channel, with the combined laser radiation of this amplifier channel again being combined by means of a combination element with the laser radiation of a second amplifier channel. When combining the individual laser beams by the aid of combination elements that can be arranged in a different manner, the same conceptual ideas as those applied before in splitting apply. Here this also means that the combination element may be comprised of numerous individual combination elements which can be arranged in the most different manner. For example, in a practical variant it can be provided for that the laser radiation of an amplifier channel has also been combined before by means of a combination element from the laser radiation of two individual amplifier channels. Likewise, the laser radiation of one of the two is amplifier channels to be combined may not have been combined before by means of a combination element.

BRIEF DESCRIPTION OF THE DRAWINGS

Various practical variants of the present invention are now intended to be explained in greater detail by way of the following figures, where.

DETAILED DESCRIPTION OF THE PREFERRED EMBODIMENTS

Figure 1:
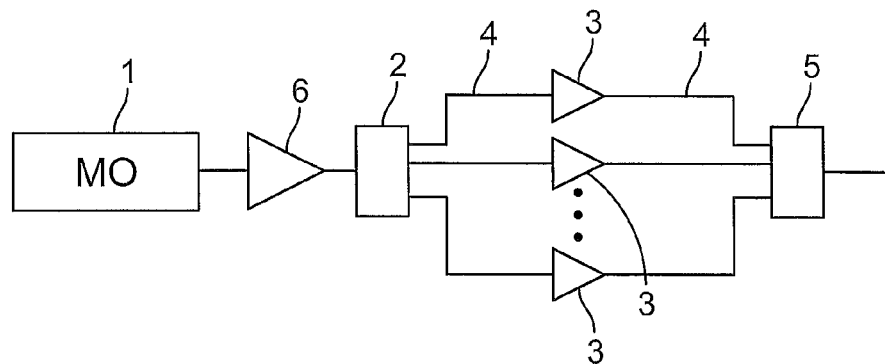
FIG. 1: shows an inventive amplifier arrangement comprising a mode-locked laser, a splitting element, several amplifier channels, and a combination element.

FIG. 1 shows an optical amplifier arrangement comprising a mode-locked laser (1), a splitting element (2), several amplifiers (3) arranged in parallel amplifier channels (4), and a combination element (5). Additionally disposed between laser (1) and the splitting element (2) is an overall pre-amplifier (6).

Figure 2:
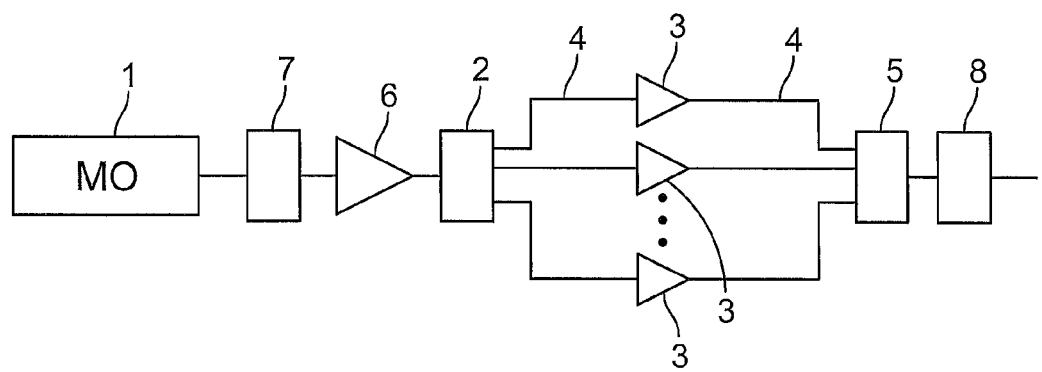
FIG. 2: shows a combination of the amplifier arrangement illustrated in FIG. 1 with a CPA system.

The invention works in such a manner that the pulsed laser radiation from the mode-locked laser (1) is pre-amplified at first by the aid of the overall pre-amplifier (6). The pre-amplified laser radiation is then split between several parallel amplifier channels (4) by means of the splitting element (2) which for example is a partly-reflecting mirror. The relevant partial beam is then amplified by way of an optical amplifier (3) in the relevant amplifier channel (4). The optical amplifiers (3) in this case are fiber-optical amplifiers. Upon amplification within the relevant amplifier channels (4), the laser split beams are recombined by a combination element (5). By the aid of the optical path length of the amplifier channels (4), it is ensured that the split beams are phase-stable towards each other and can thus be united coherently to obtain an overall laser pulse The practical example according to FIG. 2 illustrates an optical amplifier arrangement in conjunction with a CPA system. Here, the pulsed laser radiation of the mode-locked laser 1 is temporally stretched out by the aid of a pulse stretcher 7 and subsequently maximally pre-amplified by an overall pre-amplifier 6. The radiation thus pre-amplified is distributed by the aid of a splitter element 2 to several parallel amplifier channels 4. Within the relevant amplifier channels 4 there are optical amplifiers 3 which maximally amplify the laser radiation within the relevant amplifier channel 4 in such a manner that non-linear effects are basically avoided. At the end of the amplifier channels 4, the radiation portions carried in them are recombined by the aid of a combination element 5 and subsequently temporally shortened by the aid of a pulse compressor 8.

Figure 3:
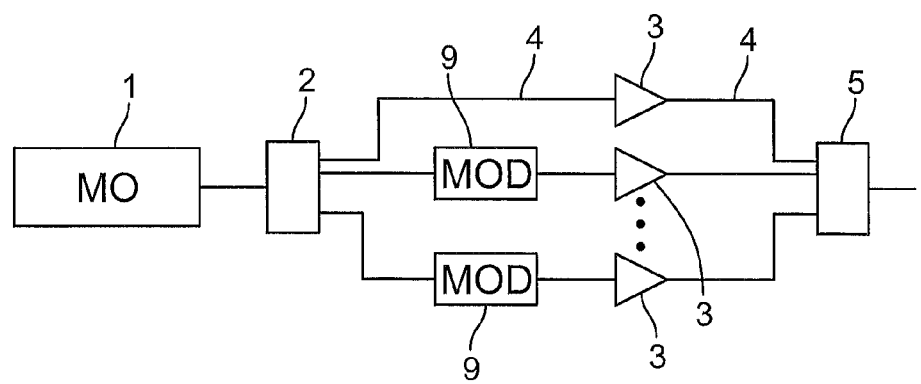
FIG. 3: shows an amplifier arrangement comprising fiber-optical modulators in several amplifier channels.

In accordance with the variant illustrated in FIG. 3, the laser radiation of a mode-locked laser 1 is also coupled into several parallel amplifier channels 4 by the aid of a splitting element 2. Located within the amplifier channels each are one fiber-optical modulator 9 which for example adjusts the phase of the guided laser radiation in such a manner that a recombination can be realized in the best possible way. For N channels it is recommendable to bring-in fiber-optical modulators into N-1 channels, said modulators serving for adapting the phase of the N-1 channels to the phase of the laser radiation guided in the first channel. Mounted downstream of the fiber-optical modulators 9 within the amplifier channels 4 are optical amplifiers 3 which amplify the modulated laser beams. Having left the amplifier channels 4, the laser beams thus modulated and amplified are re-combined by the aid of a recombination element 5. In this practical example, the combination element is realized fiber-optically or bulk-optically. In principle, however, all components can be monolithically spliced in order to ensure stability of the radiation parameters.

Figure 4:
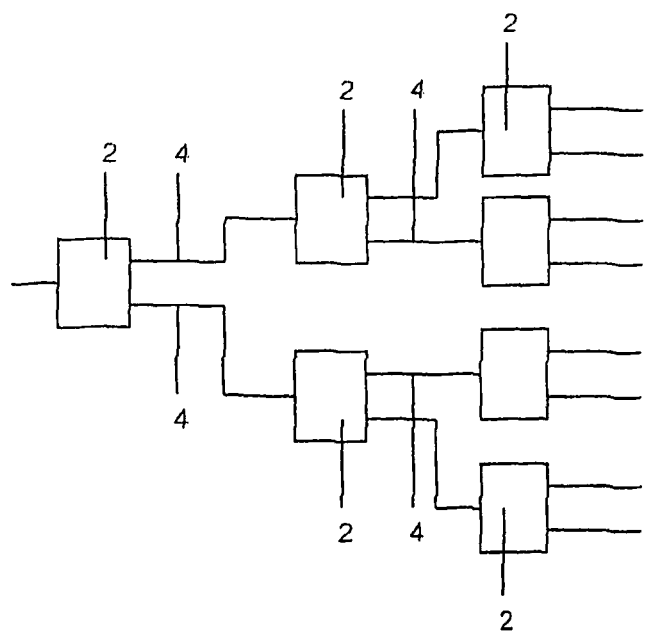
FIGS. 4a, 4b: show various arrangements of splitting elements arranged one behind the other.
Figure 4:
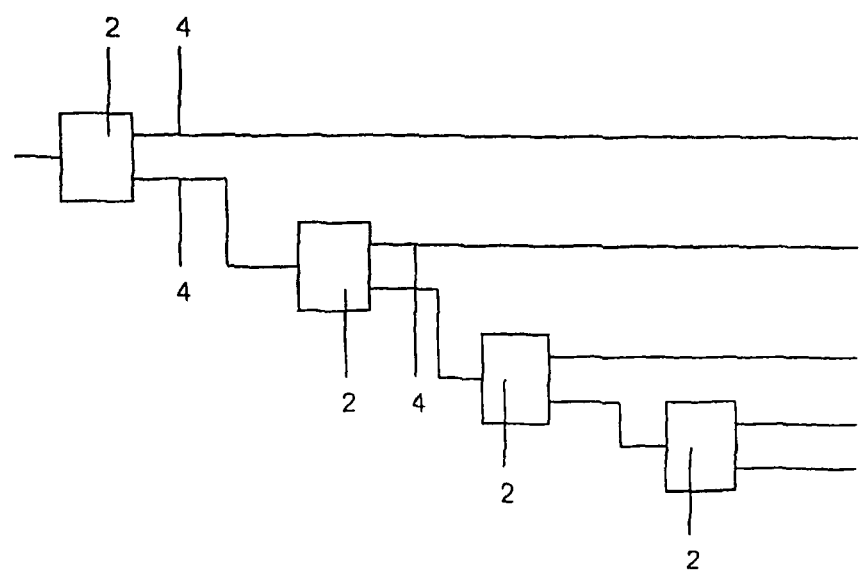

FIGS. 4a and 4b illustrate possible arrangement variants for arranging the splitting elements 2 in an arrangement one behind the other. These arrangements can be integrated as a splitting element 2 into any variant of an is optical amplifier arrangement In accordance with FIG. 4a, the laser radiation emitted from the laser 1 is split by the aid of a first splitting element 2 to two parallel amplifier channels 4. Again located in each of the two amplifier channels 3 is a splitting element 2 which again splits each of the two amplifier channels 4 into two parallel amplifier channels 4. This symmetrical stage-wise splitting structure can be realized in an arbitrary plurality of splitting stages.

In accordance with the splitting arrangement shown in FIG. 4b, the radiation emitted from the laser 1 is split to two parallel amplifier channels 4 by means of a first splitting element 2. Pursuant to this variant, another splitting element 2 splitting the laser radiation within the amplifier channel 4 again to two parallel amplifier channels 4 is only located in one of the two amplifier channels 4 thus created. Also within these two downstream arranged amplifier channels 4, there is a splitting element 2 located only in one amplifier channel 4. Here, too, splitting of the laser radiation can be realized in an arbitrary number of splitting stages.

Figure 5:
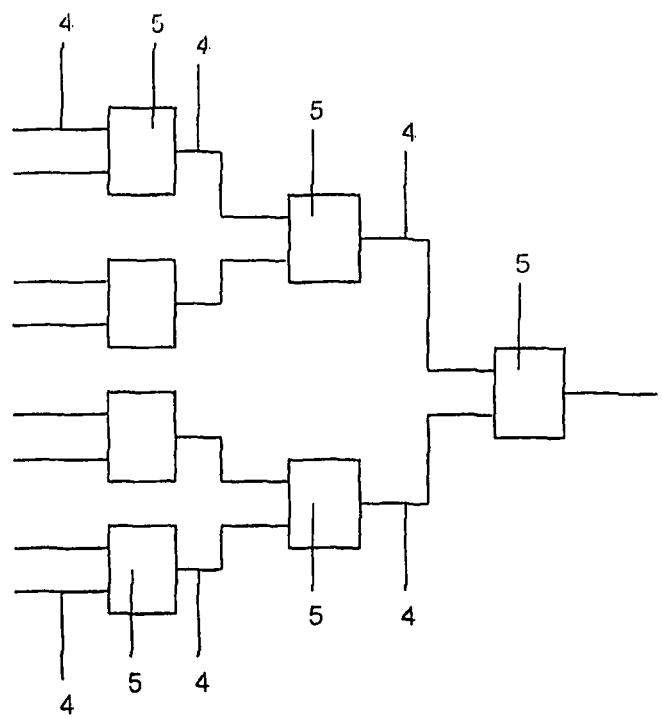
FIGS. 5a, 5b: show various arrangements of combination elements arranged one behind the other.
Figure 5:
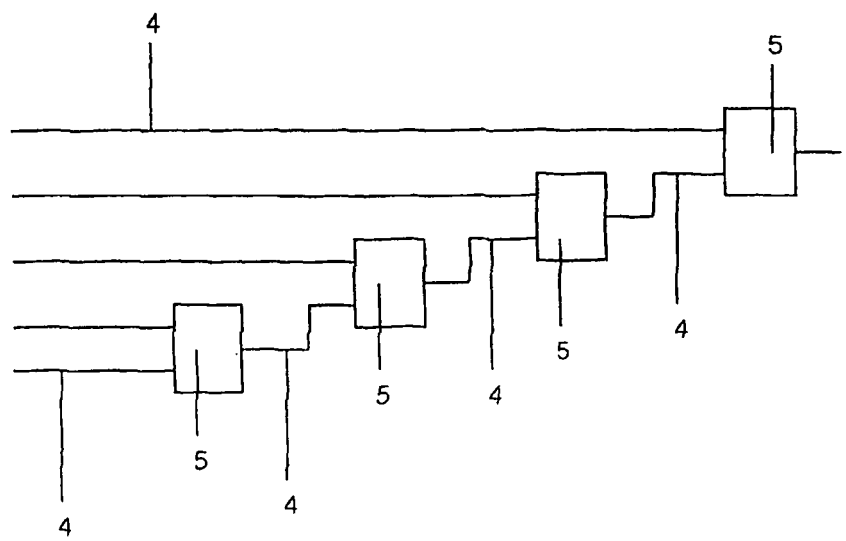

FIGS. 5a and 5b illustrate various arrangements of combination elements. Here, too, several combination elements are recombined in several combination stages arranged one behind the other.

According to FIG. 5a, eight amplifier channels 4 running in parallel are recombined in four pairs by the aid of one combination element 5 each to one common amplifier channel 4. The four amplifier channels 4 thus created are subsequently recombined by the aid of one combination element 5 to form one amplifier channel 4 so that merely two amplifier channels 4 are left over which are united by the aid of a final combination element 5 to form one overall beam.

In conformity with FIG. 5b, five parallel amplifier channels 4 are recombined to one common laser beam in such a manner that two of the five amplifier channels 4 are at first grouped by the aid of a combination element 5 to one common amplifier channel 4 so that merely four parallel amplifier channels 4 are left over. Combined to the recombined amplifier channel 4 by the aid of another combination element 5 is another amplifier channel 4 so that merely three amplifier channels 4 are left over after the combination element 5. This combination chain is carried on in another two stages in such a manner that merely one overall beam is left over after the final combination element 5.

Apart from the arrangement variants for combination elements and splitting elements illustrated in FIGS. 4a, 4b as well as 5a and 5b, a lot more arrangement variants not shown here in greater detail can be configured. Likewise, it is conceivable to connect various arrangement variants within one amplifier arrangement with each other.

The invention claimed is:

1. An optical amplifier arrangement for amplifying ultra-short pulsed laser radiation comprising
    a mode-locked laser;
    two or more optical amplifiers arranged downstream of the laser in the propagation direction of the laser radiation;
    at least one splitting element which splits the pulsed laser radiation between a plurality of amplifier channels arranged between the laser and the optical amplifiers, wherein each amplifier channel has at least one optical amplifier and wherein the at least one splitting element is a polarizing beam splitter; and at least one common combination element disposed downstream of the amplifier channels configured to superimpose the pulsed laser radiation amplified in the amplifier channels, wherein the at least one common combination element comprises sequentially arranged polarizing beam splitters;

wherein polarization of the laser radiation is rotated between the sequentially arranged beam splitters by wave plates or the sequentially arranged polarizing beam splitters are rotated relative to each other to enable further combination.

2. The optical amplifier arrangement defined in claim 1, wherein at least one overall pre-amplifier is arranged between the laser and the splitting element.

3. The optical amplifier arrangement as defined in claim 1, wherein the optical amplifiers comprise at least one fiber optic amplifier stage.

4. The optical amplifier arrangement as defined in claim 1, wherein a pulse stretcher is arranged upstream of the splitting element and wherein a pulse compressor is arranged downstream of the combination element, said units forming a CPA system in conjunction with the optical amplifiers of the amplifier channels.

5. The optical amplifier arrangement as defined in claim 1, wherein the amplifier channels comprise optical modulators.

6. The optical amplifier arrangement as defined in claim 1, further comprising several splitting elements arranged in stages one behind the other, said splitting elements each splitting the entering pulsed laser radiation between two amplifier channels.

7. The optical amplifier arrangement as defined in claim 1, further comprising several combination elements arranged in stages one behind the other, said combination elements each combining the pulsed laser radiation from two amplifier channels in a common amplifier channel, wherein the combined laser radiation of the common amplifier channel in turn is combined with the laser radiation from a second amplifier channel via a combination element.

8. A method comprising
providing an optical amplifier arrangement comprising a mode-locked laser; two or more optical amplifiers arranged downstream of the laser in the propagation direction of the laser radiation; at least one splitting element which splits the pulsed laser radiation between a plurality of amplifier channels arranged between the laser and the optical amplifiers, wherein each amplifier channel has at least one optical amplifier and wherein the at least one splitting element is a polarizing beam splitter; and at least one common combination element disposed downstream of the amplifier channels configured to superimpose the pulsed laser radiation amplified in the amplifier channels, wherein the at least one common combination element comprises sequentially arranged polarizing beam splitters; wherein polarization of the laser radiation is rotated between the sequentially arranged beam splitters by wave plates or the sequentially arranged polarizing beam splitters are rotated relative to each other to enable further combination; and using the optical amplifier arrangement to amplify ultrashort pulsed laser radiation.

* * * * *